(12) United States Patent
Ozawa et al.

(10) Patent No.: US 8,325,276 B2
(45) Date of Patent: Dec. 4, 2012

(54) SYSTEM AND METHOD FOR REAL-TIME VIDEO CONTENT SHARING WITH SYNCHRONIZATION VIA CLOSED-CAPTION METADATA

(75) Inventors: Toshiro Ozawa, San Diego, CA (US); Dang Van Tran, Laguna Niguel, CA (US); Praveen Kashyap, Irvine, CA (US); Fei Xie, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 653 days.

(21) Appl. No.: 12/548,334

(22) Filed: Aug. 26, 2009

(65) Prior Publication Data

US 2011/0050995 A1 Mar. 3, 2011

(51) Int. Cl.
*H04N 7/00* (2011.01)
(52) U.S. Cl. ............... 348/468; 725/9; 725/19; 725/20; 725/86; 725/131; 725/135; 348/473; 348/578; 348/584
(58) Field of Classification Search ................ 348/468; 725/20, 86, 9, 19, 131, 135
See application file for complete search history.

(56) References Cited

U.S. PATENT DOCUMENTS

| | | | | |
|---|---|---|---|---|
| 5,506,626 A * | 4/1996 | Yagi et al. | ...................... | 348/464 |
| 5,671,019 A * | 9/1997 | Isoe et al. | ...................... | 348/565 |
| 5,883,675 A * | 3/1999 | Herz et al. | ...................... | 348/465 |
| 6,166,780 A * | 12/2000 | Bray | ............................. | 348/632 |
| 6,476,871 B1 * | 11/2002 | Fu | ................................ | 348/465 |
| 6,587,153 B1 * | 7/2003 | Unemura | ...................... | 348/468 |
| 7,139,032 B2 * | 11/2006 | Unemura | ...................... | 348/555 |
| 7,221,405 B2 * | 5/2007 | Basson et al. | ................. | 348/468 |
| 7,467,088 B2 * | 12/2008 | Momosaki et al. | ........... | 704/270 |
| 7,548,565 B2 * | 6/2009 | Sull et al. | ...................... | 370/503 |
| 7,889,964 B1 * | 2/2011 | Barton et al. | ................. | 386/241 |
| 2003/0177503 A1 * | 9/2003 | Sull et al. | ...................... | 725/112 |
| 2003/0193615 A1 * | 10/2003 | Unemura | ...................... | 348/465 |
| 2003/0221198 A1 * | 11/2003 | Sloo | ............................. | 725/136 |
| 2004/0031058 A1 * | 2/2004 | Reisman | ...................... | 725/112 |
| 2005/0193408 A1 * | 9/2005 | Sull et al. | ........................ | 725/32 |
| 2005/0193425 A1 * | 9/2005 | Sull et al. | ........................ | 725/135 |
| 2005/0204385 A1 * | 9/2005 | Sull et al. | ........................ | 725/45 |
| 2005/0251832 A1 * | 11/2005 | Chiueh | ............................ | 725/62 |
| 2007/0300249 A1 * | 12/2007 | Smith et al. | ...................... | 725/19 |
| 2007/0300250 A1 * | 12/2007 | Smith et al. | ...................... | 725/20 |
| 2009/0094659 A1 * | 4/2009 | Candelore | ...................... | 725/131 |

* cited by examiner

*Primary Examiner* — Jefferey Harold
*Assistant Examiner* — Sam Huang
(74) *Attorney, Agent, or Firm* — Beyer Law Group LLP (57) ABSTRACT

Various disclosed embodiments included systems and methods which allow two persons in different locations to enjoy a synchronized and shared viewing experience of original content that has been edited differently for broadcast in each location. Closed captioning text data to identify synchronization points in the broadcasts and used to provide synchronization services between the two broadcasts.

18 Claims, 9 Drawing Sheets

SYSTEM AND METHOD FOR REAL-TIME VIDEO CONTENT SHARING WITH SYNCHRONIZATION VIA CLOSED-CAPTION METADATA

BACKGROUND OF THE INVENTION

1. Field of the Invention

This application relates to synchronized real-time video content sharing. In particular, this application relates to using closed-caption metadata to synchronize two or more streams of video content created from the same original content but the original content has edited differently in two streams.

2. Description of the Related Technology

Television has been historically used as a shared broadcast medium which is enjoyed in groups. Whether it be getting a group of friends together for a televised sporting event, or simply watching a favorite television program with a family member, the television has brought people together and provided shared enjoyment. As society has become more mobile, it is more common for family and close friends to live in relatively distant locales. As a result, opportunities for shared viewing and the traditional family unit has become more spread out, with family members often living in different geolocations, the opportunities for shared television viewing experiences are diminished.

In the broadcast television arena, original video content (such as a television program or movie, for example) is often modified in various ways to fit within a specific allocated time slot. For example, a motion picture (movie) which is broadcast on television may be edited by cutting out certain portions of the movie which are deemed inappropriate for the audience. The original content of the movie may also be edited to shorten its length to fit within a specific time slot. Additionally, the movie may further be edited to insert television commercials in order to meet the requirements or request of television sponsors.

In some instances, the same original content may be broadcast in two different geographical locations at the same time (on two different local affiliates, for example), but the original content may be edited differently in each location. As a result, the ability for viewer located in different locations to enjoy a synchronized viewing experience is adversely impacted by these disjointed edits to the original content. Existing techniques for video synchronization are inadequate.

SUMMARY OF CERTAIN INVENTIVE ASPECTS

The system, method, and devices of the invention each have several aspects, no single one of which is solely responsible for its desirable attributes. Without limiting the scope of this invention, several of its features will now be discussed briefly.

In a first embodiment, a method of generating synchronization points between a first television broadcast and a second television broadcast is provided. The first television broadcast comprises modified original content and second television broadcast comprises modified original content. The first television broadcast and the second television broadcast further comprise closed caption text data indicative of the content of each television broadcast, respectively. The method includes comparing closed caption text data of the first broadcast with closed caption text data of the second broadcast; identifying time synchronization points based on the comparison; and based on the identified time synchronization points, modifying the content of at least one of the first broadcast and the second broadcast.

In a second embodiment, a system for synchronizing playback of a first television broadcast and a second television broadcast is provided. The system includes a receiver configured to receive a television broadcast of video data, the video data including closed captioning data; a decoder configured to decode the closed captioning data; a memory configured to store the received video data and closed captioning data; and a control unit configured to retrieve the video from the memory and transmit at least the closed captioning data to a synchronization module; receive synchronization data from the synchronization module, the synchronization data based at least in part on the closed captioning data and closed captioning data received from the second broadcast; and control playback of the stored video data based at least in part on the synchronization data.

In a third embodiments, a synchronization device is provided. The device comprises a memory configured to store closed captioning data from a first broadcast and a second broadcast; a window selection module configured to define a first window encapsulating a number of characters in the closed caption text data of the first broadcast and define a second window encapsulating the same number of characters in the closed caption text data of the second broadcast; a comparison module configured to compare each character of the first defined window with a corresponding character in the second defined window; and a command selection module configured to generate a synchronization command and insert a synchronization point immediately after the last matching character in at least one of the first and second defined windows if one of the characters of the first defined windows does not match its corresponding character in the second defined window.

In a fourth embodiment, a method of generating synchronization points between a first television broadcast and a second television broadcast is provided. The first television broadcast comprises modified original content and second television broadcast comprises modified original content. The first television broadcast and the second television broadcast each further comprise closed caption text data indicative of the content of each television broadcast, respectively. The method includes loading the closed caption text of the first broadcast into a memory; loading the closed caption text of the second broadcast into a memory; selecting a first predefined range of characters from the closed caption text of the first broadcast; selecting a second predefined range of characters from the closed caption text of the second broadcast; comparing the first predefined range with the second predefined range; if the first predefined range matches the second predefined range: selecting a new first predefined range of characters from the closed caption text of the first broadcast adjacent to the current first predefined range of characters; selecting a new second predefined range of characters from the closed caption text of the second broadcast adjacent to the current second predefined range of characters; if the first predefined range does not match the second predefined range: inserting a synchronization point immediately after the last matching character in at least one of the first and second predefined range of characters; selecting a new second predefined range of characters from the closed caption text of the second broadcast adjacent to the current second predefined range of characters windows; and comparing the first predefined range with the new second predefined range.

DETAILED DESCRIPTION OF CERTAIN INVENTIVE EMBODIMENTS

Various disclosed embodiments included systems and methods which allow two persons in different locations to enjoy a synchronized and shared viewing experience of original content that has been edited differently for broadcast in each location. The systems and methods described herein use closed captioning text data to generate digital signatures or bookmarks which may be stored in the broadcasts and used to provide synchronization services between the two broadcasts.

Figure 1:
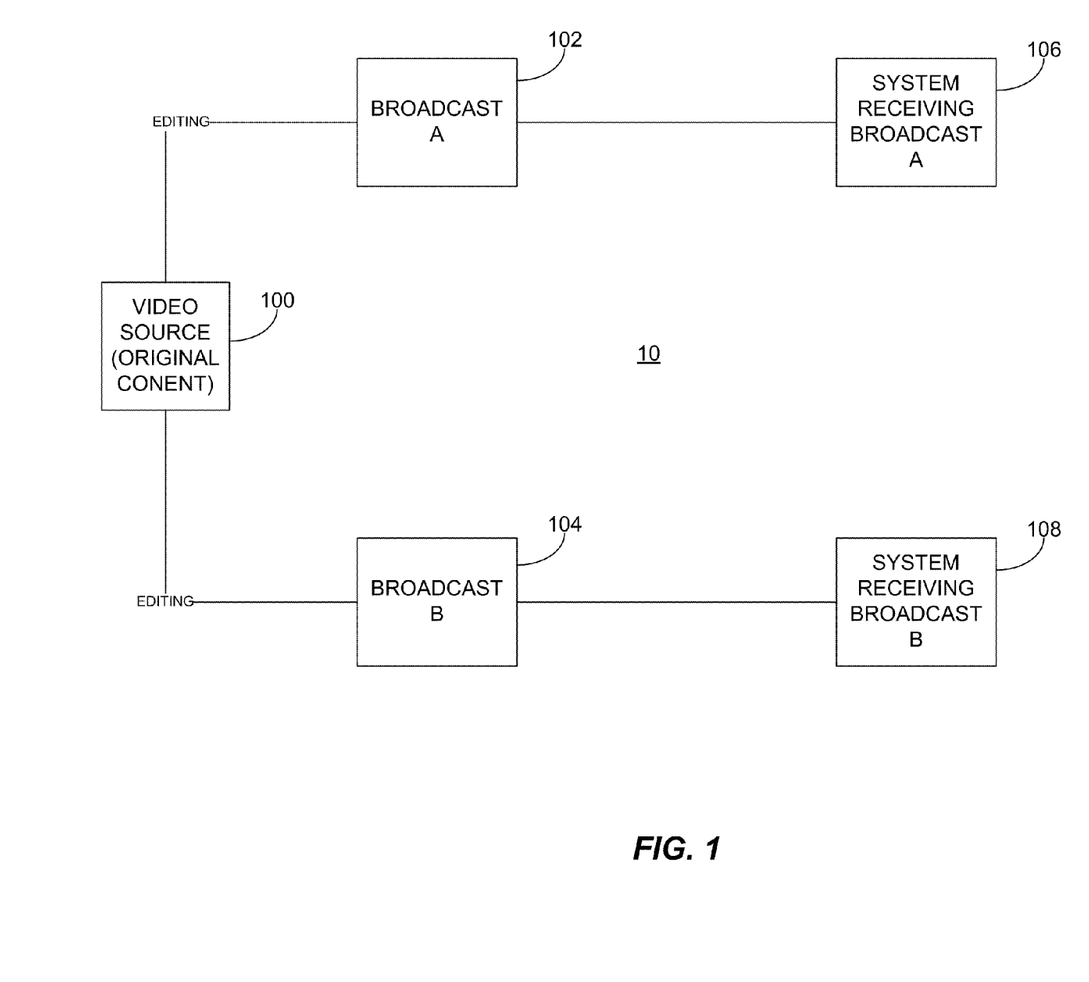
FIG. 1 is a block diagram providing one example of a broadcast television environment in which original content may be modified differently when broadcast in two different locations.

FIG. 1 a block diagram providing one example of a broadcast television environment 10 in which modifications to original content differs between two different television broadcasts. The environment 10 includes a video source providing original content 100 which may be broadcast on television by various providers. The original video content may take various forms. By way of example, and not of limitation, the original video content may include a television program, a movie, a sporting event, or any other content that may be broadcast in a television broadcast system. As noted above, it is common for the same original content to be edited differently by different broadcasters in order to satisfy various programming demands such as sponsorship obligations (including commercial breaks), content restrictions (including deletion of inappropriate content) and timing and scheduling restraints.

As shown in FIG. 1, the original content 100 may be edited for two different broadcasts—broadcast A 102 and broadcast B 104. The edits to the original content made for broadcast A 102 may be different than the edits to the original content made for broadcast B 104. Broadcast A 102 and broadcast B 104 may be television broadcasts which are transmitted along various television media. For example, broadcast A 102 may be a satellite television broadcast, while broadcast B 104 may be an over-the-air television broadcast. One or both of the broadcasts may also be cable television broadcasts, or even a closed circuit television broadcast. The two broadcasts may be on the same television network, or they may also be different television networks.

In some embodiments, the two broadcasts may be received by television systems in different locales. For example, the receiving system A 106 may be located in one city, while receiving system B 108 may be located in another city. The receiving systems 106 and 108 need not be in different cities, however, as in certain embodiments the receiving systems may be located relatively close from a physical perspective, but be receiving broadcasts over different broadcast networks or media. Receiving systems 106 and 108 are typically television systems equipped with television receivers or set-top boxes which allow the televisions to receive their respective broadcasts.

Figure 2:
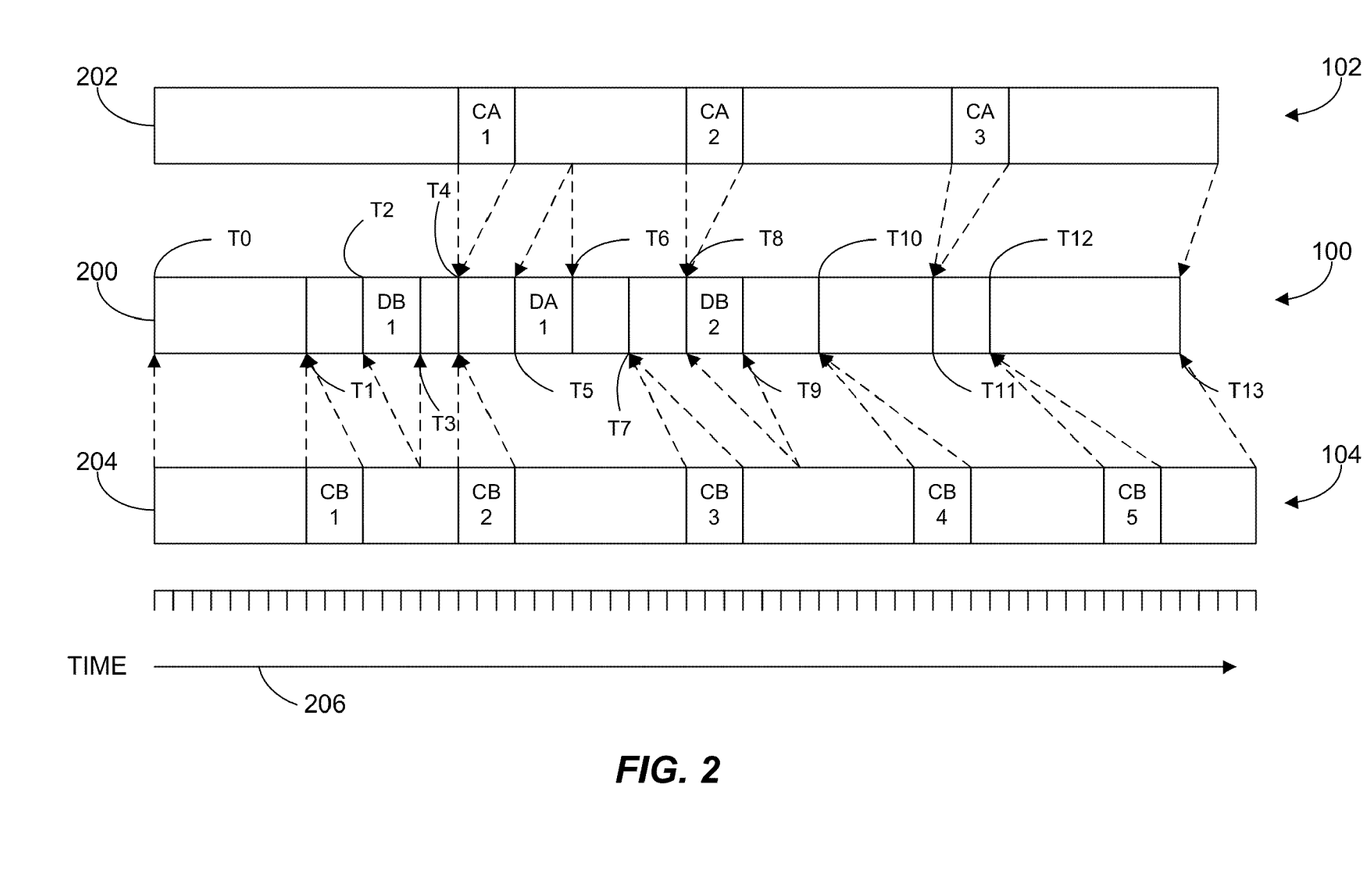
FIG. 2 is a diagram illustrating how original content may be modified differently for two different broadcasts.

FIG. 2 is a diagram illustrating how original content may be modified differently for two different broadcasts such as broadcast A 102 and broadcast B 104, for example. In particular, this figure illustrates how broadcasters may modify original content by adding commercials and/or deleting certain portions of the original program to remove some of the original content.

The original content 100 is represented in the center bar 200 of FIG. 2, while the modified content for broadcasts A 102 and B 104 are represented in the top bar 202 and bottom bar 204, respectively. The modified content as represented in the three bar graphs, shows both commercials added to the broadcast and portions of the original broadcast which have been deleted from the modified broadcasts. Commercials which have been added to the broadcasts 102 and 104 are represented by the sections having labels beginning with the letter 'C'. Arrows extending from the commercials in the bar graphs indicate the location in the original content 100 in which each respective commercial has been added for its broadcast. Portions of the original content which have been removed/deleted during the editing process are represented by the section having labels beginning with the letter 'D'. Arrows extending from the modified content bar graphs 202, 204 into the deleted portions of the original content bar graph 200 indicate the position in the location content where the original content has been removed.

In the example of FIG. 2, broadcast A 102 includes three commercial breaks (CA1, CA2, and CA3) which have been inserted into the original content. Thus, when broadcast A delivers its broadcast, three television commercial breaks will be included in the program. Broadcast A also has removed a portion of the original content (DA1) from its edited broadcast. The location of that deleted content is indicated by the arrows extending from broadcast A 202 to the borders of the content labeled DA1.

Broadcast B 104 has also been modified in this example. Specifically, five commercial breaks (CB1-CB5) have been inserted into broadcast B 104 at various locations as indicated by the location of the arrows extending from the commercial breaks into the original content bar 200. In addition, two different portions of the original content 100 have been removed. These deleted portions are shown in original content bar graph 200 by the sections labeled DB1 and DB2.

Because different modifications have been made to the original content 100 by broadcast A 102 and broadcast B 104, two viewers cannot enjoy a synchronized and shared viewing experience unless the broadcasts are synchronized. Synchronization of the two broadcasts may be achieved by recording each of the broadcasts and then controlling playback of the broadcasts in order to maintain synchronization. In order to synchronize the viewing of broadcast A 102 and broadcast B 104 as shown in FIG. 2, playback may be controlled by skipping certain portions of each broadcast at those points where the modified content has caused incongruities between broadcast A 102 and broadcast B 104.

Broadcast A 102 and broadcast B are initially synchronized, as no changes were made to the original content 100 at the very beginning of the program. Thus, synchronization is initially maintained merely by beginning playback of each broadcast at the same time and playback may begin at T0 which is the beginning of each of the broadcasts. The broadcasts are synchronized until they reach T1, where a commercial CB1 has been inserted into broadcast B 104. Thus, in order to maintain synchronization, broadcast B 104 may skip commercial CB1 in order to maintain pace with broadcast A 102. The two broadcasts then continue playing until T2, where a portion DB1 of the original content 100 has been deleted from broadcast B 104. Accordingly, broadcast A 102 may skip forward to T3 in order to remain in sync with broadcast B 104. The two broadcasts are in sync from T3 until T4, where broadcast A 102 includes commercial CA1 and broadcast B 104 includes commercial CB2. In order to continue the synchronized viewing, both broadcasts may skip their commercial. The two broadcasts may continue in sync until T5, where a portion DA1 of the original content 100 has been removed from broadcast A 102. In order to maintain synchronization, broadcast B 104 may skip to T6 in order to remain in sync.

At T7, a commercial CB3 has been inserted in the broadcast B 104. In order to maintain synchronization, broadcast B 104 may skip the commercial to maintain synchronization with broadcast A 102. At T8, broadcast A 102 includes a commercial CA2 which has been inserted. Also at T8, broadcast B 104 has deleted a portion DB2 of the original content 100. In order to maintain sync, broadcast A 102 may skip commercial CA2 and also skip DB2 (which has not been deleted from broadcast A) in order to catch up with broadcast B 104 at T9. At T10, another commercial CB4 has been inserted into broadcast B 104. In order to maintain synchronization, broadcast B 104 may skip the commercial CB4. The two broadcasts may then continue in sync until T11, where commercial CA3 has been inserted into broadcast A 102. In order to maintain synchronization, commercial CA3 may be skipped by broadcast A 102. The broadcasts may then continue to remain in sync until T12, where broadcast B 104 has inserted commercial CB5. Thus, broadcast B 104 may skip this commercial and the broadcasts remain synchronized until the end of the programs at T13.

Figure 3:
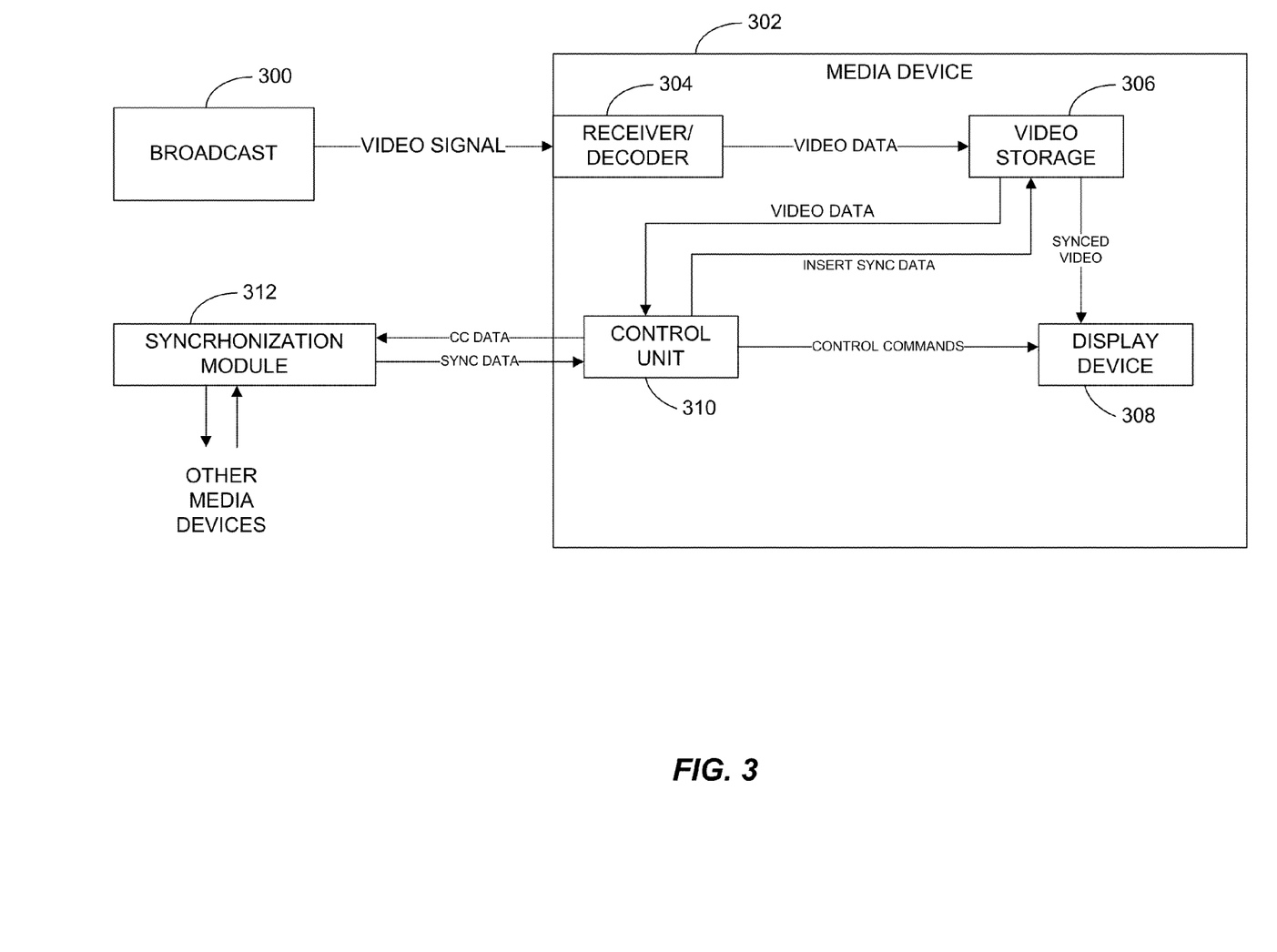
FIG. 3 is a high level system diagram illustrating a video synchronization system according to one embodiment.

In order to carry out the synchronization routine described immediately above, each of the synchronization points T1-T13 must be known. Once these synchronization points are known, they may be marked in the recordings of both broadcasts 102 and 104 using the time references specific to each broadcast. In some embodiments, these synchronization points T1-T13 may be marked as digital signatures in the stored broadcast data. FIG. 3 is a high level system diagram illustrating a video synchronization system which may be used to identify and mark synchronization points (such as T1-T13 from FIG. 2, for example) according to one or more embodiments.

The video synchronization system may include a broadcast network 300 which sends a video signal to the media device 302. The media device 302 may be connected via a network, such as the Internet, to a synchronization module 312. The broadcast network 300 may generally include, for example, a terrestrial digital television broadcast station a direct satellite broadcast network, or a data network based broadcast system.

One requirement that may be imposed on television broadcasters is a requirement that closed-captioned text be embedded in the video signal so that the audio portion of a program may be decoded and presented on a television display to assist hearing-impaired viewer as it occurs. Video broadcasters may also voluntarily include closed-caption data. Closed-caption data is typically embedded into video according to one of several generally accepted standards. For example, in the North American television, Electronic Industries Alliance standard EIA-708 provides the protocol for closed-captioning in digital television signals. Another standard EIA-608 provides a protocol for closed-captioning in analog television signals. Although implementation details may vary, the closed-caption data for a television program is often encoded into Line 21 of the vertical blanking interval—a part of the TV picture that sits just above the visible portion and is usually unseen. For digital television programming, three streams may be encoded in the video including two backward-compatible Line 21 captions, and a third set of up to 63 additional caption streams encoded in EIA-708 format. As noted briefly above, closed-caption text is typically synchronized with the video sequence so that the audio portion of a program may be decoded and displayed as it occurs. Because closed-caption text is preserved regardless of how video has been encoded or edited, it can be used to identify the synchronization points (such as T1-T13) between different broadcasts (such as broadcast A 102 and broadcast B 104) as described in more detail below.

The media device 302 may take various forms. In general, the media device 302 includes functionality sufficient to receive the transmitted video data, store the video data in a memory, access, transmit, and modify the stored video data, and display the video data on a display for viewing. In one embodiment, the media device may be a television with integrated digital video recorder functionality. Alternatively, the media device 302 may also include a plurality of separate devices which collectively provide certain functions. For example, the media device may include a television set which is coupled to a television receiver and digital video recorder.

The media device 302 typically includes a receiver/decoder 304. The receiver 304 may be configured to receive the video signal which may be transmitted as a series of video frames. The receiver may also include a closed-captioning decoder which allows it decode embedded closed captioning data into text data to display to a viewer. Of course, in certain embodiments, the decoder may be a separate component from the receiver 304. Frames of a video signal are generally provided at a particular frame rate, e.g., 24, 30, 50, or 60 frames per second. The receiver 304 may in turn transmit the received frames to a video storage 306. The video storage 306 may be hard disk drive, a solid state memory, or some other type of video storage. The media device 302 may also include a control unit 310 which is configured to receive video data from the video storage 306 and transmit the data to a synchronization module 312. The synchronization module 312 may take the form of a server computer which is located on a network (such as the Internet, for example) that is accessible by one or more media devices 302. Alternatively, the synchronization module 312 may be a software module located on one or both of the media devices 302 which is configured to communicate with other media devices via a network.

In some embodiments, the control unit 310 may extract closed-captioning data from the video data and transmit the closed-caption data to allow the synchronization module 312 to determine synchronization points among two received sets of broadcast data. The synchronization points and associated synchronization commands may then be transmitted from the synchronization module 312 back to the control unit 310 which can then insert the synchronization data into the video data that is stored in video storage 306. As will be discussed in additional detail below, the synchronization data may include both synchronization points as well as synchronization commands which manage how the data should be played in the display device 308 in order to maintain synchronization with another media device.

Figure 4:
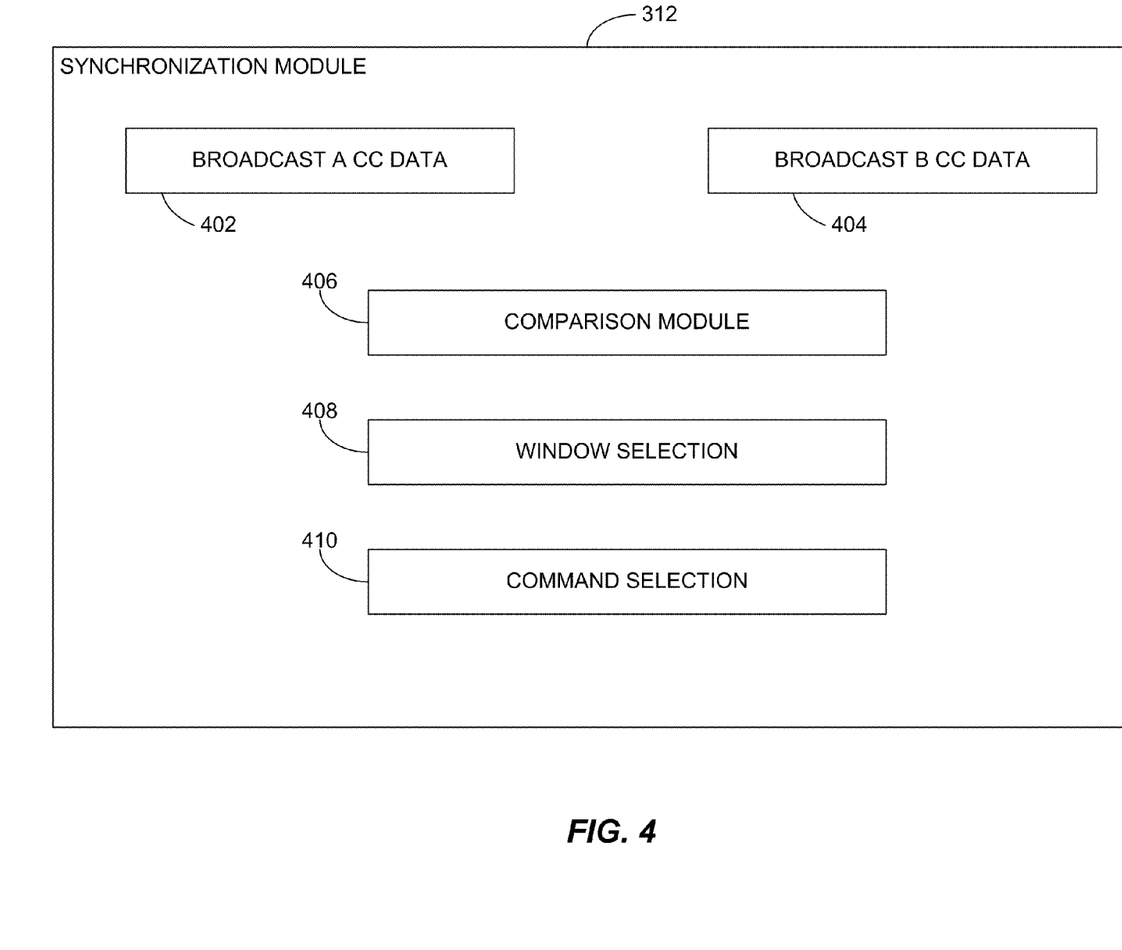
FIG. 4 is a more detailed view of the synchronization module in the video synchronization system of FIG. 3.

FIG. 4 is a more detailed view of one example of a synchronization module 312 as shown in FIG. 3. As discussed above, the synchronization module 312 may receive closed-caption data from media devices via a network connection. In the example provided in FIG. 4, the synchronization module 312 receives broadcast data from broadcast A 102 and broadcast B 104. The broadcast A data 402 may include closed-captioning data from broadcast A 102, and the broadcast B data 404 may include closed-captioning data from broadcast B 104. The synchronization module 312 may also include various sub-modules which are configured to identify synchronization points using the closed-captioning data 402, 404 from broadcast A 102 and broadcast B 104.

The sub-modules may include a comparison module 406. The comparison module 406 may be a function or routine which receives two sets of closed-captioning data and compares them to determine whether they are a match. In one embodiments, the comparison module may be a Boolean function which returns true if the closed-caption data sets match, and returns false if the data sets do not line up. The synchronization module 312 may also include a window selection module 408. As will be explained in further detail below in connection with FIGS. 5-7, the window selection module may be configured to define a search window of closed-caption text which may be moved through the captioning data of one or both of the broadcasts to compare the captioning data and identify synchronization points. When the synchronization points are identified by the synchronization module 312, a command selection module 410 may then select the appropriate command to give to the media device 302 which allows for the two broadcasts to maintain synchronization.

Figure 5A:
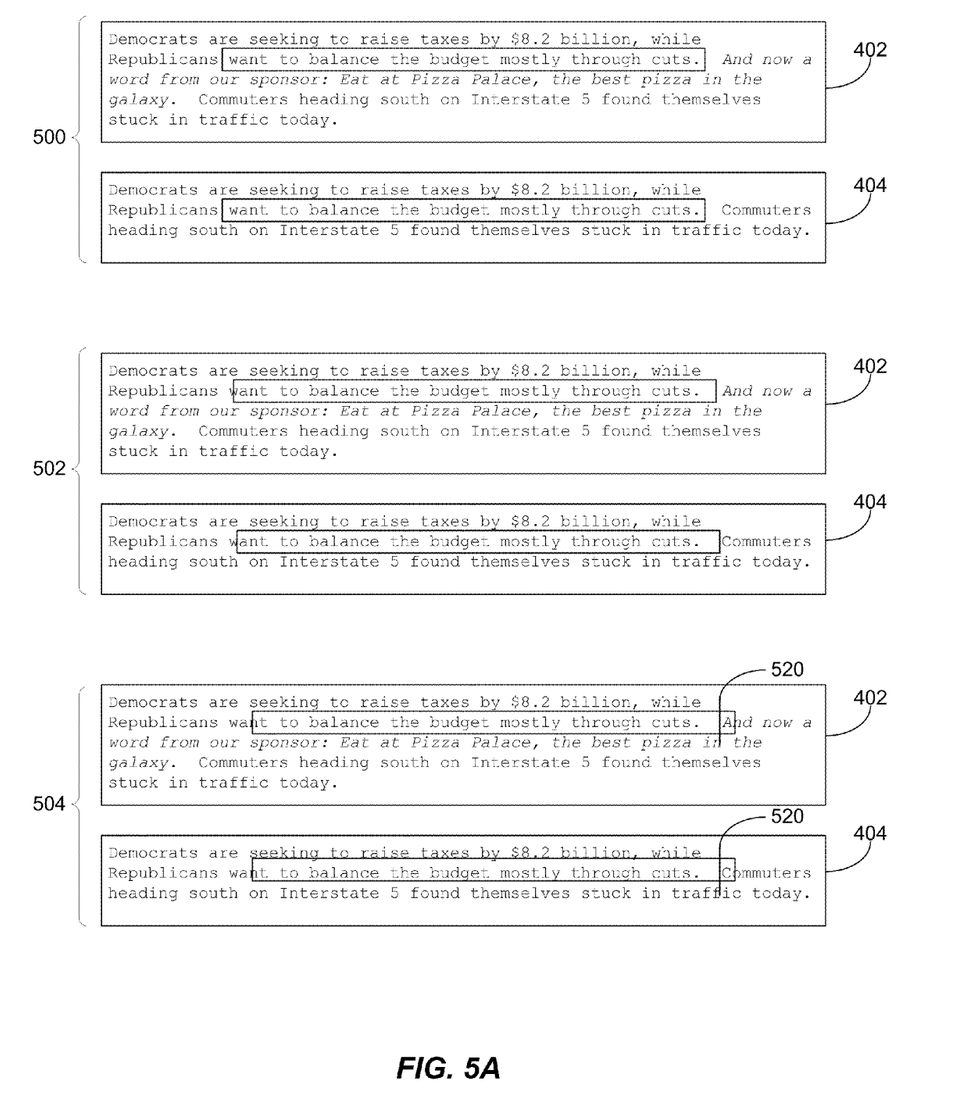
FIGS. 5A and 5B are illustrations of a moving window approach to video synchronization using closed caption data according to one embodiment.
Figure 5B:
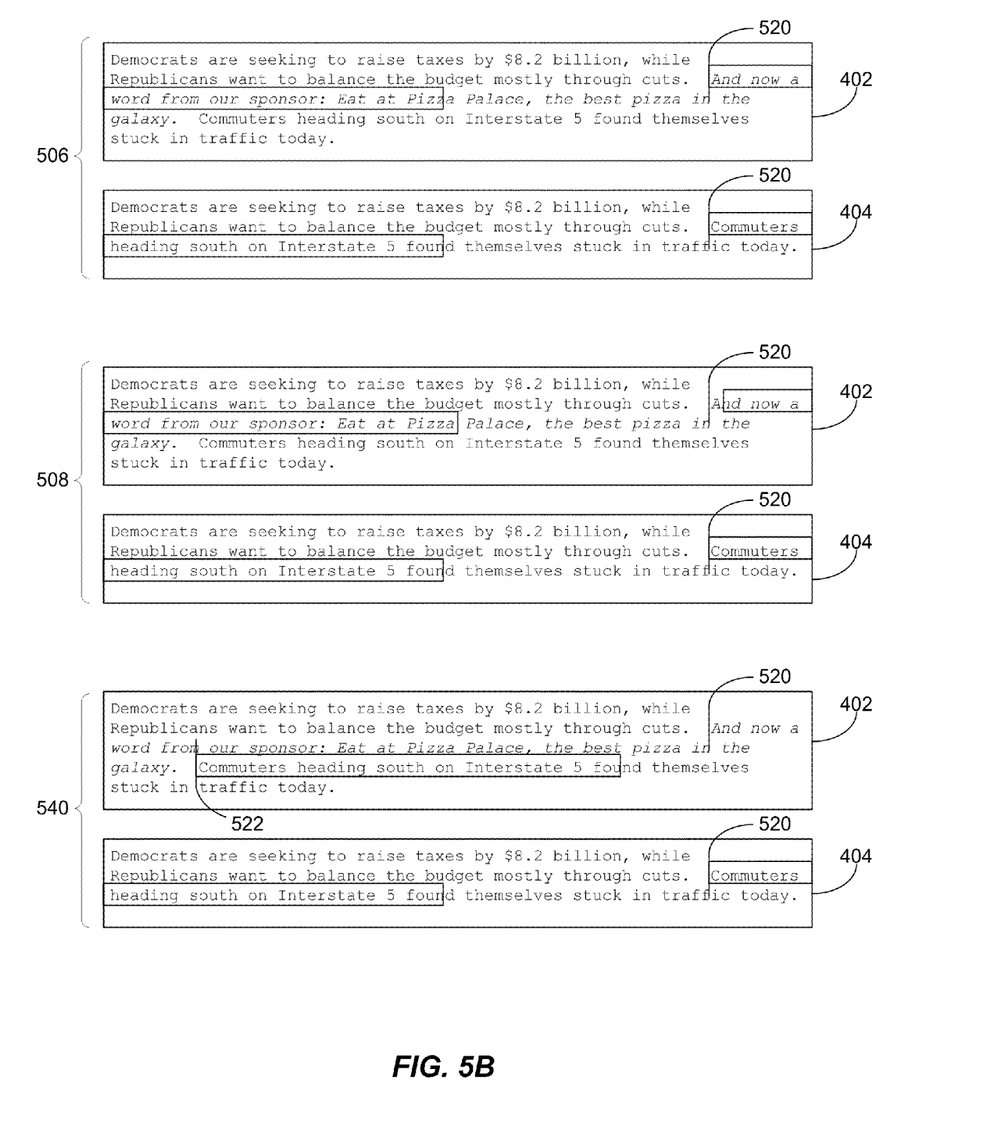

Turning now to FIGS. 5A and 5B, an example of how a moving search window may be used on two sets of closed captioning data is provided. A moving window is shown progressing in various stages (500, 502, 504, 506, 508, 510) through each of the two sets of closed captioning data 402 and 404 in order to identify synchronization points in the data. The two sets of closed captioning data 402 and 404 are similar, but data set 402 also includes a commercial message (shown in italics). Stage 500 shows a moving window where the broadcasts are synchronized (prior to reaching the commercial break), as the captioning text in each window is identical. At stage 502, the moving window in each of the data sets 402 and 404 advances one character. At this point the two data sets 402 and 404 still remain synchronized.

Each of the windows in data set 402 and 404 then moves forward an additional character at stage 504 to reach the beginning of the commercial break in data set 402. The last character in window for data set 402 is a 'A', while the last character in window for data set 404 is a 'C'. Thus, the closed captioning data is different between data set 402 and data set 404. As a result, a synchronization point 520 is defined at the location that the windows were last synchronized. Because the windows were synchronized up to the synchronization point 520, the moving windows may advance to that location, skipping those characters already known to be in sync shown at stage 506 of FIG. 5B.

Once the windows have skipped to the synchronization point 520, one of the windows may then be move forward through the captioning test 402 one character at a time (with the other window remaining stationary). With each forward movement of the window, the new window may be compared to the stationary window in order to locate a match. Stage 508 in FIG. 5B illustrates a one character forward movement of the window in data set 402, where no match is found. The window in data set 402 continues to move forward until a match is found as shown in stage 510. When the match is found, an additional synchronization point 522 is added at the location that the caption data becomes synchronized again. Thus, by moving the data window forward in the data set 402, the location at which the data sets 402 and 404 become synchronized again is identified.

Figure 6A:
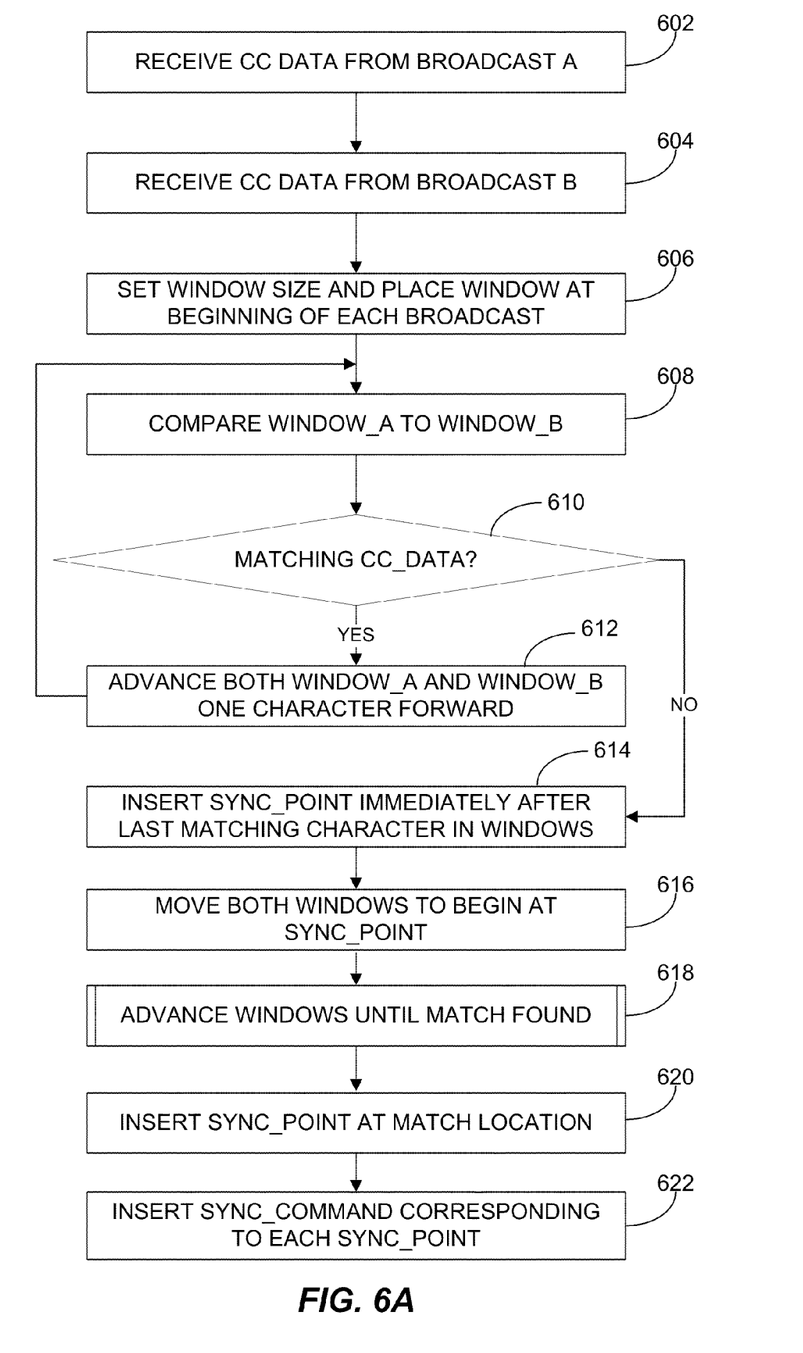
FIG. 6A is a flowchart of a general process for synchronizing video content between two broadcasts.

FIG. 6A is a flowchart illustrating a process by which the synchronization module 312 may be used to synchronize broadcast A 102 with broadcast B 104 using closed captioning data according to one embodiment. The process begins at block 602, where the synchronization module 312 receives closed caption data 402 from the broadcast A 102. As discussed above, this closed captioning data may be sent to the synchronization module 312 by a control unit 310 in a media device 302. The process then moves to block 604, where the synchronization module 312 receives closed caption data 404 from broadcast B 104.

Next, at block 606, the moving window size may be defined (possibly by window selection module 408). In one embodiment, the window size may be set to 30 characters, but various different window sizes may be used. Once the window size has been set, a window of the selected window size is then placed at the beginning of each of the sets of closed captioning data 402 and 404.

The process then moves to block 608, where the comparison module 406 compares the data in the two defined windows. At decision block 610, if the closed caption data matches in the two windows, then the process moves to block 612. At block 612, each of the two defined windows is advanced one character in its respective closed caption text data and the process then returns to block 608 where the new windows are compared.

If at decision block 610, the closed captioning data 402 and 404 does not match, the process jumps to block 614 where a synchronization point (such as synchronization point 520 from FIGS. 5A and 5B) is inserted just after to the last character matching character in each of the defined windows (and before the first non-matching character). Next, the process moves to block 616, where both windows are moved to the synchronization point 520. Once the windows have been advanced, the process then moves to block 618, where one or both of the windows are moved until another match is found. Additional details for the process of block 618 are provided in FIG. 7 below. Once the matching closed captioning data is found, the process then moves to block 620, where a second synchronization point 522 is inserted at the location of the match. Once the match has been found again, a synchronization command is then inserted into the closed captioning data 402 and 404. The synchronization command typically will be an instruction for the display device 308 to skip video between the two synchronization points 520 and 522 in one of the broadcasts. In the example provided in FIGS. 5A and 5B, a "skip" command would be inserted which instructs the video player t skip the italicized text in data set 402. This process may be repeated on all of the closed captioning data 402 and 404 until the end of each broadcast has been reached. At that point, each of the synchronization points has been identified between the two broadcasts and inserted into the data sets, and the synchronization commands have been inserted as well.

As discussed above, process described in FIG. 6A generates synchronization points by incrementally moving windows along the closed captioning data of each respective broadcast and comparing those windows for matching data. In situations where there are long silences in audio or repetition in phrases in the programming, the synchronization process shown in FIG. 6A may not be the best suited for generating synchronization points (although it may still be used in such situations). An alternative process may be used in which a larger window size may be used to ensure that it is unique. The larger window size may be selected based on the type of programming being synchronized. For example, in movies or television programs where long silences may occur, a window size of 120 bytes may be used. Alternatively, in a newscast, a window size of 30 bytes may suffice. This larger window size may be problematic in situations where network bandwidth is limited, for example. In order to avoid these inefficiencies, rather than basing the window on a pre-defined range of characters, a run length encoded predefined range may instead be used. Run length encoding compresses repeated characters, which may overcome problems associated with long silence across many frames. Using run length encoding may further increase the information entropy, thereby making it more likely that the synch point is unique be based on a run. A simple hash may be applied to the run length encoded windows to reduce the size of the pre-defined range. Hashing each range allows for a smaller dataset to be transmitted across the network, while preserving the uniqueness of the data.

Figure 6B:
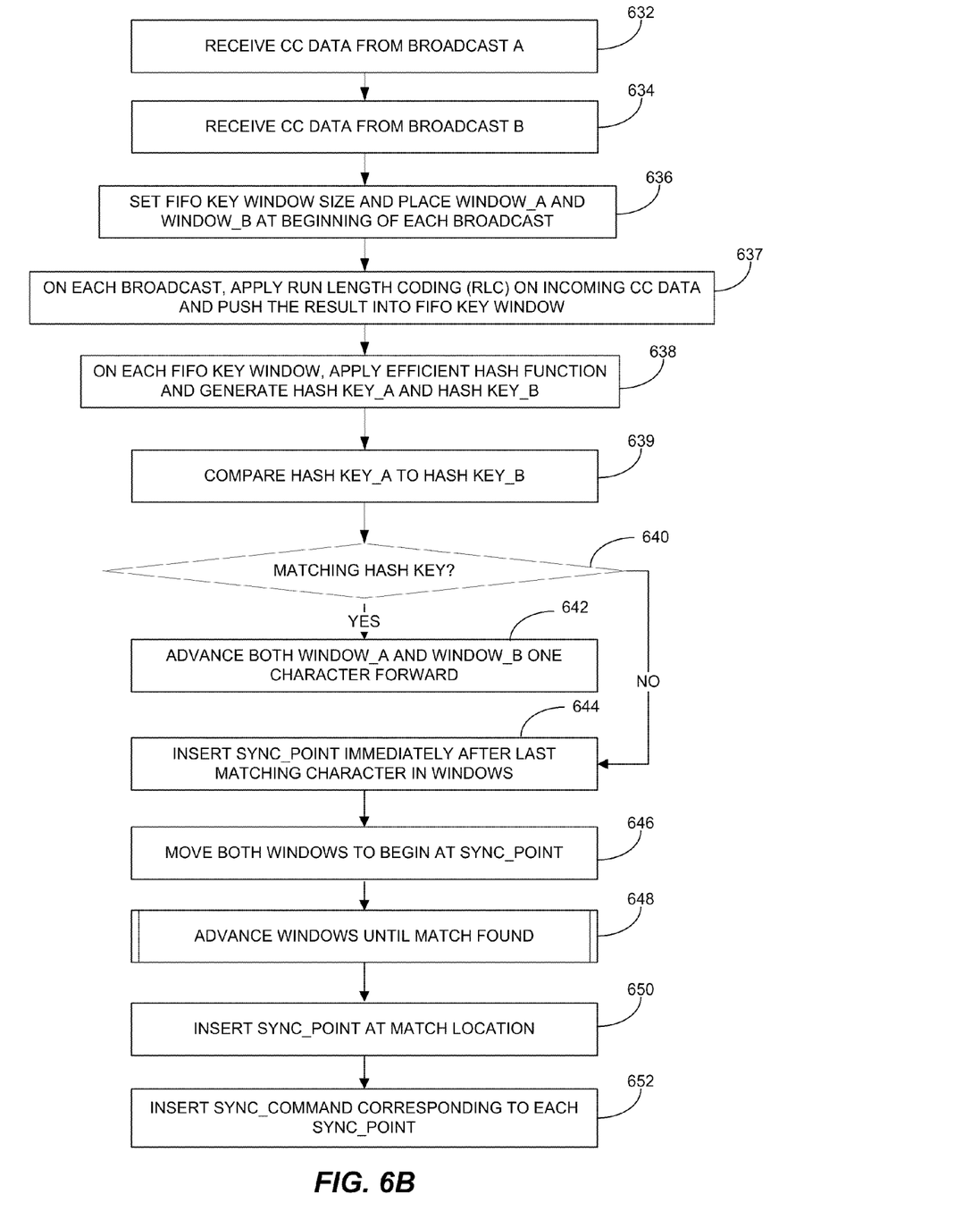
FIG. 6B is a flowchart of another process for synchronizing video content between two broadcasts.

FIG. 6B is a flowchart of another process for synchronizing video content between two broadcasts which utilizes run length encoding and hashing algorithms. The process begins at block 632, where the synchronization module 312 receives closed caption data 402 from the broadcast A 102. The process then moves to block 634, where the synchronization module 312 receives closed caption data 404 from broadcast B 104. Next, at block 636, the window may be defined (possibly by window selection module 408). In one embodiment, the window may a first-in-first-out (FIFO) key window. Once the window is defined, it is then placed at the beginning of each of the sets of closed captioning data 402 and 404.

The process then moves to block 637, where on each broadcast, run length encoding is applied on incoming closed captioning data, and the result of the run length encoding is pushed into each respective window. Next, at block 638, a hash function is applied to each window and a hash key A and hash key B are generated for broadcast A and broadcast B, respectively. At block 639, hash key A is compared to hash key B. The process then moves to decision block 640, where if the hash keys match, the process moves to block 642 where each window is advanced by a character. If the hash keys do not match at block 640, the process instead moves to block 644 where a synchronization point is inserted just after to the last character matching character in each of the defined windows (and before the first non-matching character). Next, the process moves to block 646, where both windows are moved to the synchronization point 520. Once the windows have been advanced, the process then moves to block 648, where one or both of the windows are moved until another match is found. Once the matching closed captioning data is found, the process then moves to block 650, where a second synchronization point 522 is inserted at the location of the match. Once the match has been found again, a synchronization command is then inserted into the closed captioning data 402 and 404 at block 652.

Figure 7:
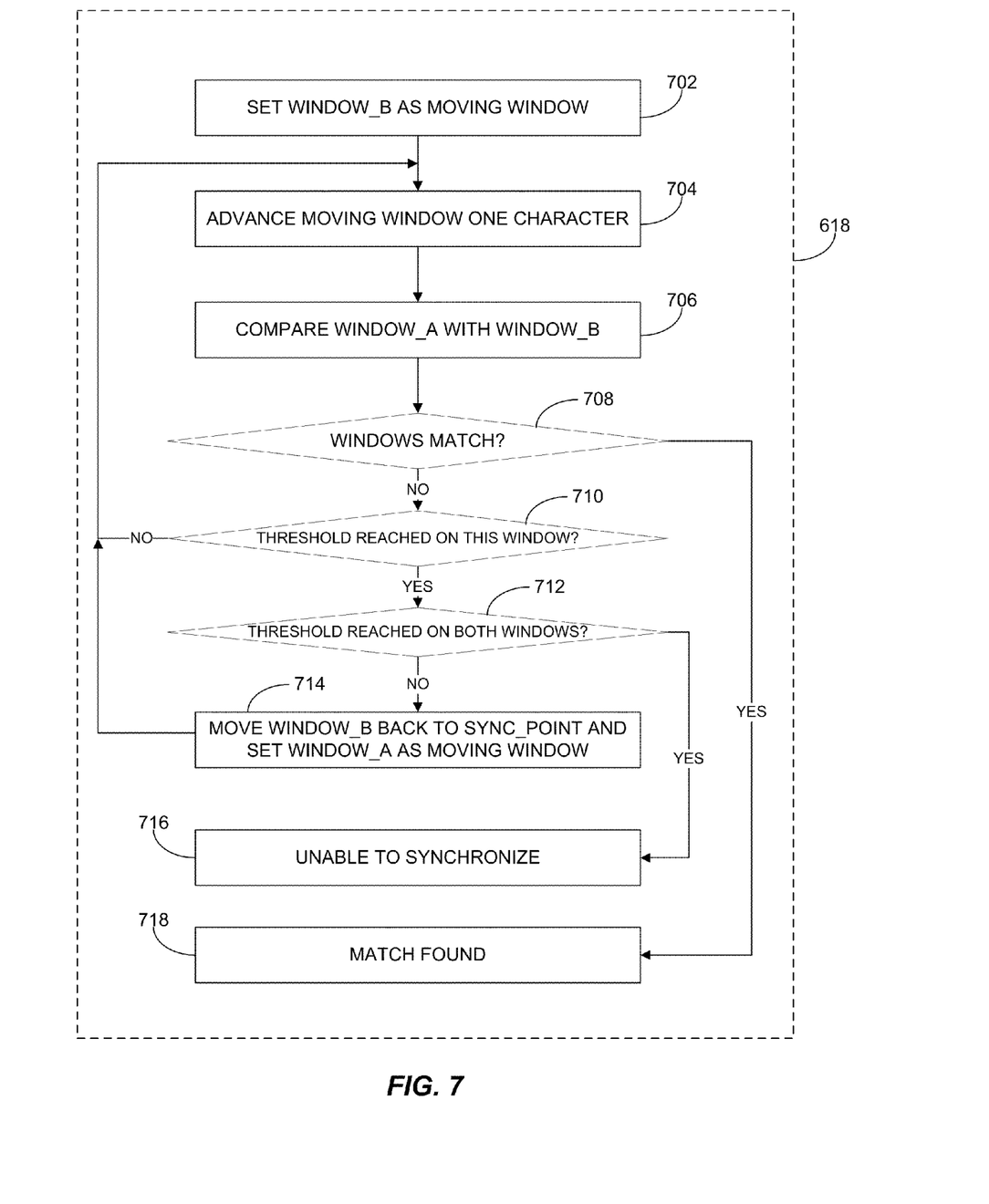
FIG. 7 is a more detailed flowchart of the more general process identifying synchronization points shown in FIG. 6.

As noted above, at block 618 of FIG. 6A, when the closed caption data falls out of sync, the defined windows may be advanced by the synchronization module 312 until a match is found indicating synchronization between the broadcasts. FIG. 7 is an example of a sub-process that may be used to carry out block 618 in FIG. 6A.

The process begins at block 702, where the window associated with broadcast B 104 is set as the moving window by the synchronization module 312. Next, the process moves to block 704, where the moving window is advanced one character, and the contents of the window are compared with the contents of the window associated with broadcast B 102 at block 706.

After the comparison is made in block 706, the process then moves to decision block 708, where it is determined whether the two compared windows match. If the windows match, the process moves to block 718 and a match is found. If the windows do not match, the process instead moves to decision block 710 where the synchronization module 312 determines whether the movement threshold has been reached for the moving window. As noted above, a threshold may be set which limits the number of characters that the moving window may advance. In some embodiments, the threshold may be a time limit (e.g. 5 minutes). In other embodiments, the threshold may be defined as a number of characters (e.g., 18,000 characters). If the threshold has not been reached on the current moving window, the process returns to block 704 and the moving window is advanced one character and the process repeats. If the threshold for the current moving window has been reached, the process moves to decision block 712 where it determines whether the threshold has been reached on both windows (e.g., closed caption data A 402 and closed caption data B 404). If the threshold has been reached for both windows, the two data sets 402 and 404 are unable to synchronize and the process moves to block 716 and terminates with a synchronization error. If the threshold has not been reached for both windows, the process moves to block 714. At block 714, the current moving window is returned back to the synchronization point to remain stationary, and the other window is set as the moving window. Once the other window has been set as the moving window, the process returns to block 704 and the text comparison routine is repeated.

Those of skill will recognize that the various illustrative logical blocks, modules, circuits, and algorithm steps described in connection with the embodiments disclosed herein may be implemented as electronic hardware computer software or combinations of both. To clearly illustrate this interchangeability of hardware and software, various illustrative components, blocks modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present invention. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from and write information to, the storage medium. In the alternative, the storage medium may be integral to the processor.

The processor and the storage medium may reside in an ASIC. The ASIC may reside in a user terminal. In the alternative the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the presently disclosed embodiment may be embodied within a form that does not provide all of the features and benefits set forth herein, as some features may be used or practiced separately from others. The scope of the invention is indicated by the appended claims rather than by the foregoing description. All changes, which come within the meaning and range of equivalency of the claims are to be embraced within their scope.

What is claimed is:

1. A method of generating synchronization points between a first television broadcast and a second television broadcast, the first television broadcast comprising first modified original content and second television broadcast comprising second modified original content, the first television broadcast and the second television broadcast each further comprising closed caption text data indicative of the content of each television broadcast, respectively, the method comprising:
    defining a first window encapsulating a number of characters in the closed caption text data of the first television broadcast;
    defining a second window encapsulating the same number of characters in the closed caption text data of the second television broadcast;
    comparing each character of the first defined window with the corresponding character in the second defined window;
    inserting a synchronization point immediately after a last matching character in at least one of the first and second defined windows if one of the characters of the first defined window does not match its corresponding character in the second defined window;
identifying time synchronization points based on the comparison; and
    based on the identified time synchronization points, modifying at least one of the first modified original content and the second modified original content of at least one of the first television broadcast and the second television broadcast.

2. The method of claim 1, wherein modifying at least one of the first modified original content and the second modified original content of at least one of the first television broadcast and the second television broadcast further comprises
    inserting time synchronization points in at least one of the first television broadcast and second television broadcast.

3. The method of claim 1, wherein modifying at least one of the first modified original content and the second modified original content of at least one of the first television broadcast and the second television broadcast further comprises:
    inserting synchronization commands into at least one of the first television broadcast and second television broadcast.

4. The method of claim 3, wherein the synchronization commands comprise:
    commands which cause a display device to skip a portion of at least one of the first television broadcast and the second television broadcast.

5. The method of claim 1, wherein the identified time synchronization points comprises:
    data indicative of time reference information in at least one of the first television broadcast and the second television broadcast.

6. A system for synchronizing playback of a first television broadcast and a second television broadcast, comprising:
    a receiver configured to receive a television broadcast of video data, the video data including closed captioning data;
    a decoder configured to decode the closed captioning data;
    a memory configured to store the received video data and closed captioning data; and
    a control unit configured to:
    retrieve the video from the memory and transmit at least the closed captioning data to a synchronization module, wherein the synchronization module is part of a media device and includes a comparison module configured to compare the closed captioning data received from the first television broadcast and the second television broadcast and a window selection module configured to define a moving window in the closed captioning data of the first television broadcast and the second television broadcast and to define a threshold limit for window movement;
    receive synchronization data from the synchronization module, the synchronization data based at least in part on the closed captioning data and closed captioning data received from the second television broadcast; and
    control playback of the stored video data based at least in part on the synchronization data.

7. The system of claim 6, wherein the synchronization data comprises synchronization points indicative of locations in the video data where at a portion of at least one of the first or second television broadcast is to be skipped.

8. The system of claim 6, wherein the synchronization module is further configured to:
    define a first window encapsulating a number of characters in the closed caption text data of the first broadcast;
    define a second window encapsulating the same number of characters in the closed caption text data of the second broadcast; and
    compare each character of the first defined window with the corresponding character in the second defined window.

9. The system of claim 8, wherein the synchronization module is further configured to:
    insert a synchronization point immediately after the last matching character in at least one of the first and second defined windows if one of the characters of the first defined windows does not match its corresponding character in the second defined window.

10. A synchronization device, comprising:
    a memory configured to store first closed captioning text data from a first broadcast and to store second closed captioning text data from a second broadcast;
    a window selection module configured to define a first window encapsulating a number of characters in the first closed caption text data of the first broadcast and define a second window encapsulating the same number of characters in the second closed caption text data of the second broadcast;

a comparison module configured to compare each character of the first defined window with a corresponding character in the second defined window; and a command selection module configured to generate a synchronization command and insert a synchronization point immediately after the last matching character in at least one of the first and second defined windows if one of the characters of the first defined windows does not match its corresponding character in the second defined window.

11. The system of claim 10, wherein if the comparison module determines that the first window matches the second window, the window selection module is further configured to define a new first window and new second window in the closed caption text adjacent to the first window and second window respectively.

12. The system of claim 10, further comprising a network interface configured to receive the first closed captioning text data from the first broadcast and the second closed captioning text data from the second broadcast over a network.

13. The system of claim 12, wherein the first closed captioning text data received from the first broadcast and the second closed captioning text data from the second broadcast are sent over the network by one or more media devices.

14. The system of claim 13, wherein the media device comprise digital video recorders.

15. The system of claim 14, wherein the media devices further comprise digital television receivers.

16. A method of generating synchronization points between a first television broadcast and a second television broadcast, the first television broadcast comprising modified original content and second television broadcast comprising modified original content, the first television broadcast and the second television broadcast each further comprising closed caption text data indicative of the content of each television broadcast, respectively, the method comprising:

loading the closed caption text of the first television broadcast into a memory;

loading the closed caption text of the second television broadcast into a memory;

selecting a first predefined range of characters from the closed caption text of the first television broadcast;

selecting a second predefined range of characters from the closed caption text of the second television broadcast;

comparing the first predefined range with the second predefined range;

if the first predefined range matches the second predefined range:

selecting a new first predefined range of characters from the closed caption text of the first television broadcast adjacent to the current first predefined range of characters; and selecting a new second predefined range of characters from the closed caption text of the second television broadcast adjacent to the current second predefined range of characters;

if the first predefined range does not match the second predefined range:

inserting a synchronization point immediately after the last matching character in at least one of the first and second predefined range of characters;

selecting a new second predefined range of characters from the closed caption text of the second television broadcast adjacent to the current second predefined range of characters; and comparing the first predefined range with the new second predefined range.

17. A method of generating synchronization points between a first television broadcast and a second television broadcast, the first television broadcast comprising first modified original content and second television broadcast comprising second modified original content, the first television broadcast and the second television broadcast each further comprising closed caption text data indicative of the content of each television broadcast, respectively, the method comprising:

defining a first window and a second window according to a window size;

applying run length encoding on the closed caption text data of the first television broadcast and the second television broadcast;

pushing the encoded closed caption text data from the first television broadcast into the first window;

pushing the encoded closed caption text data from the second television broadcast into the second window;

applying a hash algorithm to each of the first and second windows to generate a first and second hash key;

comparing the first hash key with the second hash key;

identifying time synchronization points based on the comparison; and based on the identified time synchronization points, modifying at least one of the first modified original content and the second modified original content of at least one of the first broadcast and the second broadcast.

18. A system for synchronizing playback of a first television broadcast and a second television broadcast, comprising:

a receiver configured to receive a television broadcast of video data, the video data including closed captioning data;

a decoder configured to decode the closed captioning data;

a memory configured to store the received video data and closed captioning data; and a control unit configured to:

retrieve the video from the memory and transmit at least the closed captioning data to a synchronization module configured to:

define a first window encapsulating a number of characters in the closed caption text data of the first broadcast;

define a second window encapsulating the same number of characters in the closed caption text data of the second television broadcast;

compare each character of the first defined window with the corresponding character in the second defined window; and insert a synchronization point immediately after the last matching character in at least one of the first and second defined windows if one of the characters of the first defined windows does not match its corresponding character in the second defined window;

receive synchronization data from the synchronization module, the synchronization data based at least in part on the closed captioning data and closed captioning data received from the second television broadcast; and control playback of the stored video data based at least in part on the synchronization data.

* * * * *